United States Patent [19]
Nehl et al.

[11] Patent Number: 5,460,309
[45] Date of Patent: Oct. 24, 1995

[54] CONTAINER WITH RECEPTACLE FOR INSTALLING IN VEHICLE

[75] Inventors: Wolfgang Nehl, Waldachtal; Torsten Bieck, Dornstetten, both of Germany

[73] Assignee: fischerwerke, Artur Fischer GmbH & Co. KG., Waldachtal, Germany

[21] Appl. No.: 153,179

[22] Filed: Nov. 16, 1993

[30] Foreign Application Priority Data

Dec. 11, 1992 [DE] Germany .................. 9216892 U

[51] Int. Cl.$^6$ ........................................... B60R 7/00
[52] U.S. Cl. .................. 224/281; 224/483; 224/553; 224/554; 296/37.12; 312/274; 312/9.17
[58] Field of Search .......................... 224/280, 281, 224/282, 42.45 R, 273; 296/37.8, 37.9, 37.10, 37.12–37.16; 312/270.1, 270.2, 270.3, 274, 275, 319.1, 9.17

[56] References Cited

U.S. PATENT DOCUMENTS

| | | | |
|---|---|---|---|
| 2,487,537 | 11/1949 | Gantner | 224/281 |
| 4,660,881 | 4/1987 | Komeya et al. | 224/281 |
| 4,676,544 | 6/1987 | Dabringhaus et al. | 296/37.9 |
| 4,712,845 | 12/1987 | Nicol | 224/281 |
| 4,925,072 | 5/1990 | Masler et al. | 224/281 |
| 5,065,920 | 11/1991 | Amner | 224/281 |

FOREIGN PATENT DOCUMENTS 0157452  7/1986  Japan .................. 224/282

*Primary Examiner*—Henry J. Recla
*Assistant Examiner*—Steven O. Douglas
*Attorney, Agent, or Firm*—Michael J. Striker

[57] ABSTRACT

A container for installing in a vehicle has a housing having an open front side, a cover pivotally mounted on the housing at the open front side, a storage receptacle formed as a storage tray and connected to the cover so that when the cover is opened the storage tray is displaced out of the housing into a removal position, a slide guidable and lockable in the housing, the storage tray being hingedly mounted on the slide, a drive member moving the slide toward the open front side of the housing, and a coupling link which connects the storage tray to the cover and having a control pin connected to the storage tray and displacing the storage tray outside the housing into the removal position in which the storage tray is partially uprightly oriented.

6 Claims, 2 Drawing Sheets

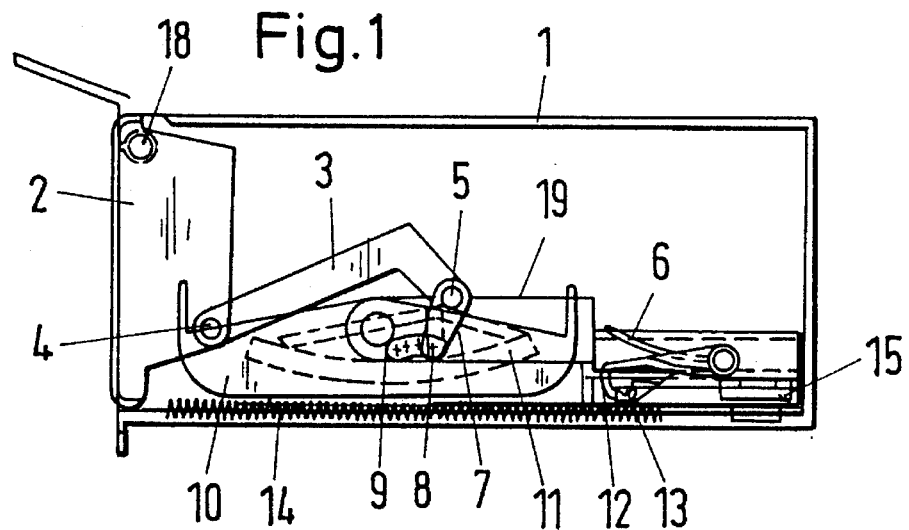
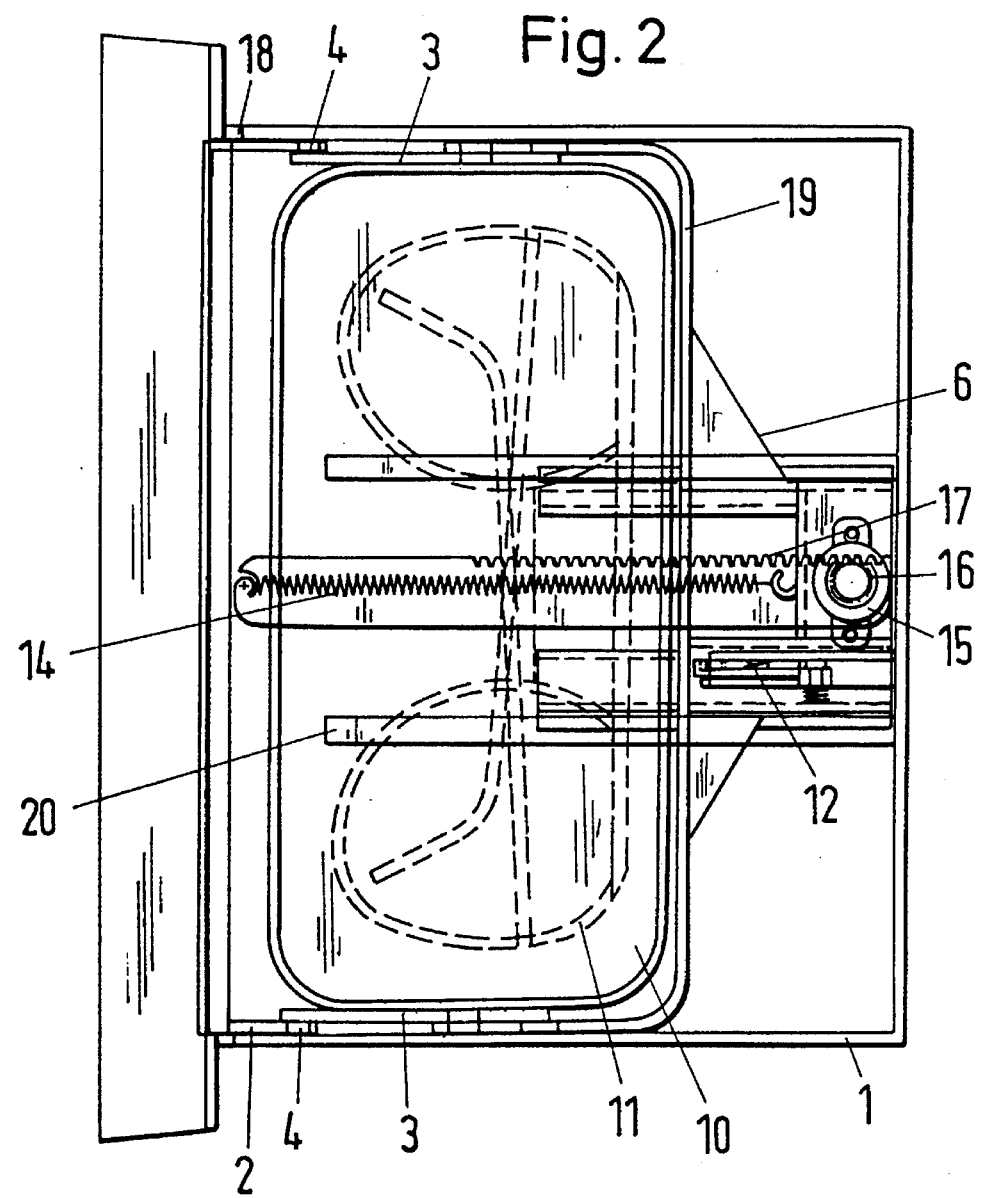

CONTAINER WITH RECEPTACLE FOR INSTALLING IN VEHICLE

BACKGROUND OF THE INVENTION

The present invention relates to a container with a receptacle, in particular for storing receptacles, for installing in a vehicle.

More particularly, it relates to a container of the above mentioned type which has an open-front housing and a cover pivotally mounted on the open side.

Containers of the above mentioned general type are known in the art. Known containers have several openings open at a front side and are used for storing sound carriers such as music cassettes and compact discs in vehicles. A slider member on which a cassette is placed is inserted in a housing and can be pushed into the housing for storage. In order to remove the cassette, the slider member connected to the cover is unlocked by a lock button, and a pressure spring arranged between the rear wall of the slider member and the housing displaces the slider member together with the cassette out of the housing into the removal position.

It is often desirable to store other articles in the vehicle, for example spectacles, in addition to storing the cassettes. Spectacle boxes which can be fixed to a dashboard of the vehicle by adhesive strips have been already proposed. These spectacle boxes are generally in the form of open trays in which the spectacles can be placed. Since the trays are open, the spectacles are not stored in a dust-free environment. Furthermore, gripping means is needed to hold the spectacles in place, which makes it difficult to remove and insert the spectacles during driving. Moreover, for aesthetic reasons, the covered storage place which can be integrated in the dashboard of the vehicle is frequently desired.

SUMMARY OF THE INVENTION

Accordingly, it is an object of the present invention to provide a container with a receptacle, in particular for storing spectacles, which avoids the disadvantages of the prior art.

More particularly, it is an object of the present invention to provide a container with a receptacle, in particular for storing spectacles, for installation in an existing opening in the vehicle which provides a closed, dust-proof and easily used storage place.

In keeping with these objects and with others which will become apparent hereinafter, one feature of the present invention resides, briefly stated, in a container in which the receptacle is formed as a tray which is hingedly mounted on a slide that is guided and arranged to be locked in a housing, the slide is engaged by a drive member which moves the slide toward an open side of the housing, and the storage tray is joined to the cover by a coupling link hingedly mounted on the storage tray and the cover and having a control pin which is joined to the storage tray and conveys the storage tray outside the housing into a partially upright removal position.

When the storage tray is hingedly mounted on the displaceable slide which is guided in the housing, it can be brought into a horizontal orientation in the storage position and into a partially upright, convenient orientation in the removal position. Despite the fact that the cover which serves for dust-free storage projects after it has been opened, access to and removal of the spectacles is easy. At the same time the partially upright orientation of the storage tray in the removal position requires only small amount of space so that the container can be arranged in the dashboard within reach of the driver, and even in the region of the gear lever.

With the coupling link hingedly mounted on the storage tray and cover, when the slide has been unlocked, the storage tray is moved by a drive member into the removal position outside the housing. This constrained movement which is controlled by the coupling ring opens the cover on the one hand and displaces the slide with the storage tray toward the front opening of the housing on the other hand. During closing of the cover, a reverse sequence of movements is performed which returns the storage tray to the storage position.

In accordance with one embodiment of the invention, the drive member is a tension spring which is tensioned between the housing and the slide. In this construction the spring is tensioned by closure of the cover.

In accordance with another feature of the present invention, the drive member can be also formed as an electric motor which is operated by a switch through pressure on the cover.

When the tension spring is formed as a drive member, a damping element can be arranged on the slide and engage a toothed rack formed on the housing. Therefore the movement for ejection of the slide and the storage tray is damped.

In accordance with still another feature of the present invention, the control pin of the coupling link can be guided in a curved slot of the storage tray so as to provide a non-jamming and expedient sequence of movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a container with a receptacle in accordance with the present invention;

FIG. 2 is a plan view of the inventive container shown in FIG. 1;

DESCRIPTION OF THE PREFERRED EMBODIMENTS

Figure 3:
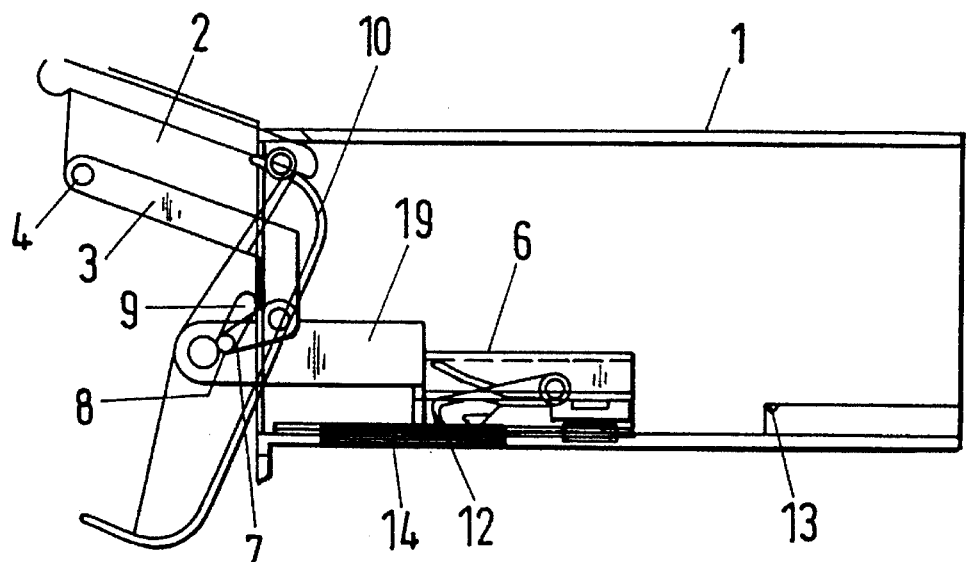
FIG. 3 is a side view of the inventive container in an open condition.

A container in accordance with the present invention has a housing 1 which is open at its one side and a pivotable cover 2 which is hingedly attached to the housing at the open side. A coupling link 3 has one end connected to the cover 2 by a hinge 4 and another end connected to a slide 6 by a hinge 5. The coupling link 3 has an elongated angled lever arm 7 with a control pin 8. The control pin 8 engages in a curved slot 9 of a receptacle formed as a storage tray 10.

In FIGS. 1 and 2 the storage tray 10 is shown in a storage position in which it is oriented horizontally and located completely within the housing 1. In the storage position the cover 2 is closed to provide a dust-free place for storing the spectacles 11. In this position the slide 6 is locked by a locking device 12 and a locking pin 13 arranged on the housing. A tension Spring 14 serves as a drive member. It has one end connected to the slide 6 and another end connected to the housing 1 and in the storage position is expanded so that a tensile stress is produced. By applying pressure to the cover 2, the slide 6 is moved by the coupling link 3 toward the rear side of the container, so that the locking device 12 is released from the locking pin 13. The tensile stress of the tension spring 14 now moves the slide 6 toward the open side of the housing.

Figure 4:
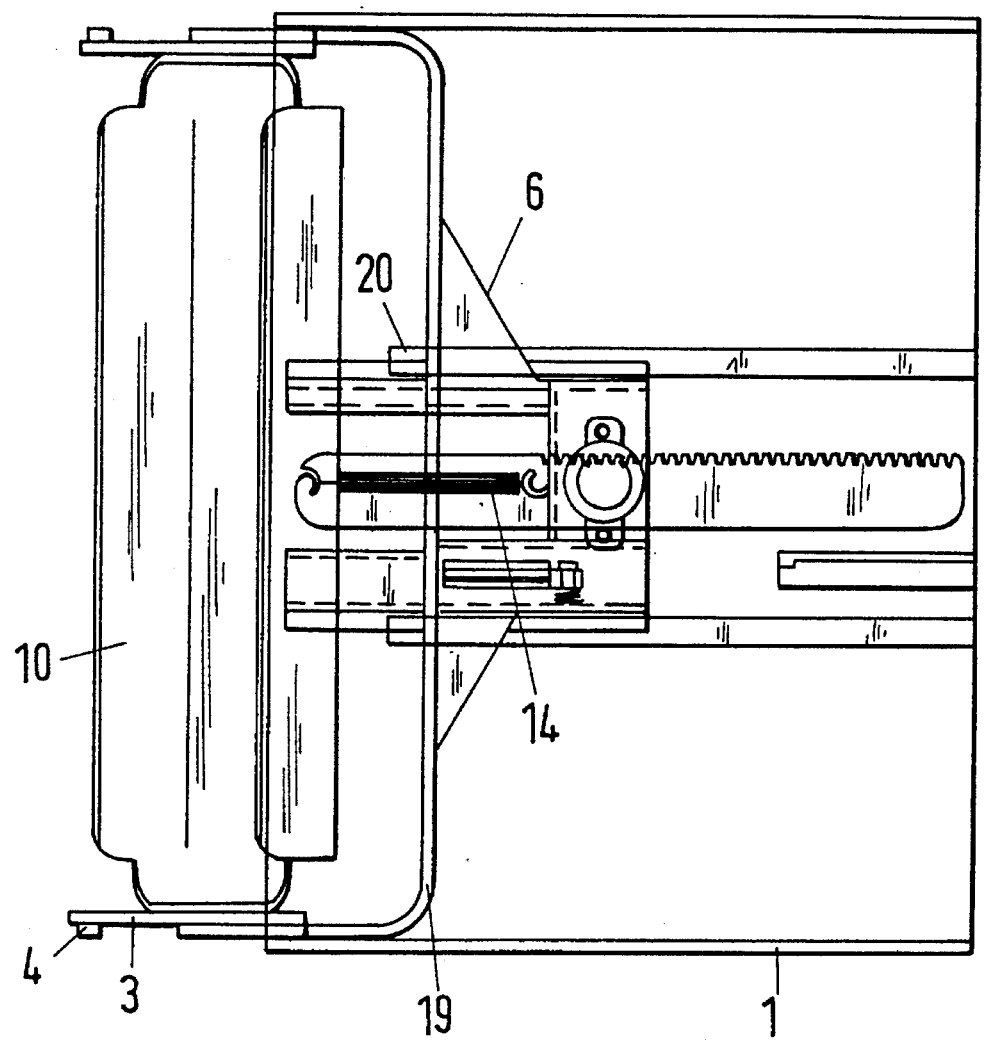
FIG. 4 is a plan view of the inventive-container shown in FIG. 3.

The movement of the slide 6 is damped by a damping element 15 which is arranged on the slide 6 and has a gear wheel 16 engaging with a toothed rack 17 formed on the housing 1. At the same time, the coupling link 3 turns the cover 2 upwards about a hinge point 18 and the container is thus opened. The storage tray 10 hingedly mounted on a forked member 19 of the slide 6 is displaced by the control pin 8 into a removal position shown in FIGS. 3 and 4 in which it is oriented partially upright. Despite the upwardly hinged cover 2 which masks the storage tray, it is easy to remove the spectacles 11 from the storage tray 10. The slide 6 guided in guide ways 20 is held in the end position against the limiting faces of the guide ways 20 by the spring 14.

In order to close the container the cover 2 is pressed downwardly. The slide 6 is then pushed back again by the coupling link 3 until the locking device 12 engages the locking pin 13. During the return movement of the slide the spring 14 is tensioned again.

It will be understood that each of the elements described above, or two or more together, may also find a useful application in other types of constructions differing from the types described above.

While the invention has been illustrated and described as embodied in a container with a receptacle for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A container for installing in a vehicle, comprising a housing having an open front side; a cover pivotally mounted on said housing at said open front side; a storage receptacle formed as a storage tray and connected to said cover so that when said cover is opened said storage tray is displaced out of said housing into a removal position; a slide movable in said housing, said storage tray being hingedly mounted on said slide; a drive member moving said slide toward said open front side of the housing; and a coupling link pivotally connecting said storage tray and said cover for displacing said storage tray outside said housing into said removal position in which said storage tray is partially uprightly oriented.

2. A container as defined in claim 1, wherein said drive member is a tensioned spring which is tensioned between said housing and said slide.

3. A container as defined in claim 1; and further comprising a toothed rack formed on said housing; and a damping element arranged on said slide and having a gear wheel which engages with said toothed rack.

4. A container as defined in claim 1, wherein said storage tray has a curved slot, and said coupling link has a control pin being guided in said curved slot of said storage tray.

5. A container as defined in claim 1, wherein said slide is lockable in said housing; and further comprising means for locking said slide in said housing.

6. A container for installing in a vehicle, comprising, a housing having an open side; a cover pivotally connected with said housing at said open side; a receptacle formed as a storage tray and connected with said cover so that when said cover is opened said storage tray is displaced out of said housing into a removal position; and a slide movable in said housing, said storage tray being hingedly mounted on said slide and connected to said cover so that when said storage tray is inside said housing it has a substantially horizontal orientation and when said storage tray is moved to said removal position outside said housing it assumes a partially upright orientation.

* * * * *